United States Patent
LeBlanc

(10) Patent No.: US 6,591,509 B2
(45) Date of Patent: Jul. 15, 2003

(54) FLOATING BENCH SAW GUIDE

(76) Inventor: Rodrigue Raymond LeBlanc, 326 rue Pineault, Atholville, New Brunswick (CA), E3N 4A4

(*) Notice: Subject to any disclaimer, the term of this patent is extended or adjusted under 35 U.S.C. 154(b) by 90 days.

(21) Appl. No.: 09/833,689

(22) Filed: Apr. 13, 2001

(65) Prior Publication Data

US 2002/0148121 A1 Oct. 17, 2002

(51) Int. Cl.[7] .................. B27B 5/18; B13D 47/02; B23B 51/02
(52) U.S. Cl. ................ 30/374; 83/522.19; 83/745; 30/375
(58) Field of Search ............... 83/745, 522.19; 30/374, 375

(56) References Cited

U.S. PATENT DOCUMENTS

| | | | | |
|---|---|---|---|---|
| 2,800,933 A | * | 7/1957 | Michael .................. 30/373 |
| 3,043,351 A | * | 7/1962 | Davis ..................... 30/373 |
| 3,434,514 A | | 3/1969 | McManama ............. 143/47 |
| 3,738,211 A | * | 6/1973 | Carter, Sr. ............. 83/522.25 |
| 3,927,475 A | * | 12/1975 | Chang .................... 30/373 |
| 4,016,649 A | | 4/1977 | Kloster ................... 30/373 |
| 4,128,940 A | | 12/1978 | Ong ....................... 30/373 |
| 4,135,419 A | | 1/1979 | Chapin ................... 83/471.3 |
| 4,138,914 A | * | 2/1979 | Reeder ................... 83/745 |
| 4,237,762 A | | 12/1980 | Winter ................... 83/745 |
| 4,397,089 A | | 8/1983 | Pease ..................... 30/373 |
| 4,483,071 A | * | 11/1984 | te Kolste ............... 30/388 |
| 4,509,398 A | * | 4/1985 | Mason .................... 83/745 |
| 4,624,054 A | * | 11/1986 | Edwards ................. 30/374 |
| 4,628,608 A | | 12/1986 | Kuhlmann .............. 30/373 |
| 4,630,656 A | * | 12/1986 | Collins ................... 83/574 |
| 4,751,865 A | * | 6/1988 | Buckalew ............... 83/745 |
| 4,777,726 A | * | 10/1988 | Flowers .................. 30/374 |
| 4,852,257 A | | 8/1989 | Moore .................... 30/373 |
| 4,909,111 A | | 3/1990 | Noble ..................... 83/397 |
| 4,945,799 A | * | 8/1990 | Knetzer .................. 83/745 |
| 4,947,910 A | * | 8/1990 | Reneau ................... 144/1.1 |
| 4,977,938 A | * | 12/1990 | Greeson .................. 83/745 |
| 5,035,061 A | | 7/1991 | Bradbury ................ 33/430 |
| 5,062,460 A | * | 11/1991 | DeLine ................... 30/375 |
| 5,070,562 A | * | 12/1991 | Lentino .................. 83/745 |
| 5,080,152 A | | 1/1992 | Collins ................... 144/134 |
| 5,107,736 A | | 4/1992 | Albrecht ................. 83/471.3 |
| 5,243,891 A | * | 9/1993 | Smith, Jr. ............... 30/374 |
| 5,381,602 A | * | 1/1995 | Matzo et al. ........... 30/375 |
| 5,509,338 A | * | 4/1996 | Ekker .................... 83/745 |
| 5,566,456 A | * | 10/1996 | Sawyer, Jr. ............. 30/374 |
| 5,649,366 A | * | 7/1997 | Scheiman ............... 30/374 |
| 5,682,934 A | * | 11/1997 | Rybski ................... 144/144.1 |
| 5,787,782 A | * | 8/1998 | Downard et al. ....... 83/745 |
| 5,815,931 A | | 10/1998 | Cleveland ............... 30/374 |
| 5,815,933 A | * | 10/1998 | Staniszewski .......... 30/374 |
| 5,901,450 A | | 5/1999 | James ..................... 30/373 |
| 5,921,161 A | | 7/1999 | Newell ................... 83/574 |
| 6,412,179 B1 | * | 7/2002 | Ende ...................... 30/374 |
| 6,484,410 B1 | * | 11/2002 | Meastas .................. 30/375 |

* cited by examiner

Primary Examiner—Allan N. Shoap
Assistant Examiner—Jason Prone
(74) Attorney, Agent, or Firm—Mario Theriault

(57) ABSTRACT

A floating bench saw guide for guiding a portable circular saw along a workpiece while sawing the workpiece, has a cradle for retaining a portable circular saw, a saw plane across the cradle, and a guide lip movably affixed to the cradle. A pair of gage blocks are affixed to the cradle along the saw plane. The gage blocks are advantageous for allowing the use of a straight edge for easily positioning the blade of a circular saw along the saw plane. In another feature of the invention, a pair of spaced-apart parallel rails are affixed to the cradle. The guide lip is movably affixed to the rails and is reversible relative to the saw plane. The guide lip overhangs its mountings to the rails such that it is positional relative to the saw plane over a distance which is longer than the length of the rails.

19 Claims, 8 Drawing Sheets

FLOATING BENCH SAW GUIDE

FIELD OF THE INVENTION

This invention pertains to portable circular saw guides and more particularly it pertains to circular saw guides which have universal saw mounting cradles, reversible guiding edges and rulers.

BACKGROUND OF THE INVENTION

It can be difficult for a carpenter to carry a conventional table saw from one job site to another. This can be particularly difficult when the project involves the working on a roof or on other parts of a building requiring the transport of tools in stairs, in ladders or on scaffolding. This inconvenience with conventional table saws has created a need for a portable device that is compact, lightweight and that can be used to perform substantially the same work as can be done on a conventional table saw.

In the past, several circular saw guides have been developed and used with varying degrees of success. The known circular saw guides belong to two groups wherein the devices in each group have common characteristics. The main feature of the saw guides in the first group consists of an anchor device which attaches to the skid plate of a portable circular saw. A guiding edge is mounted on a stem which is telescopically movable in a socket mounted to the anchor device. The circular saw is used in a conventional manner but with the guiding edge following the straight edge on the panel being sawn. Examples of circular saw guides belonging to the first group are described and illustrated in the following documents:

U.S. Pat. No. 4,128,940, issued on Dec. 12, 1978 to José K. Ong;
U.S. Pat. No. 4,397,089, issued on Aug. 9, 1983 to Mason E. Pease;
U.S. Pat. No. 4,628,608, issued on Dec. 16, 1986 to Gerhard Kuhlmann et al.;
U.S. Pat. No. 5,035,061, issued on Jul. 30, 1991 to Timothy Bradbury et al.;
U.S. Pat. No. 5,815,931, issued on Oct. 6, 1998 to Todd Cleveland, and
U.S. Pat. No. 5,901,450, issued on May 11, 1999 to Thomas P. James.

The second group of circular saw guides of the prior art is characterized by the mounting of the portable saw in a cradle which is movably supported or fixedly attached to a pair of rails. A guiding edge or the saw itself is movable along the rails so that the relative positions of the guiding edge and the saw are adjustable, for sawing a panel or a board at selected places. Examples of saw guides of the second group are illustrated and described in the following documents:

U.S. Pat. No. 3,434,514, issued on Mar. 25, 1969 to Charles E. McManama;
U.S. Pat. No. 4,016,649, issued on Apr. 12, 1977 to James R. Kloster;
U.S. Pat. No. 4,135,419, issued on Jan. 23, 1979 to Everett E. Chapin;
U.S. Pat. No. 4,237,762, issued on Dec. 9, 1980 to Kevin J. Winter;
U.S. Pat. No. 4,852,257, issued on Aug. 1, 1989 to Kenneth D. Moore;
U.S. Pat. No. 4,909,111, issued on Mar. 20, 1990 to Walter E. Noble;
U.S. Pat. No. 5,080,152, issued on Jan. 14, 1992 to Michael Collins et al.;
U.S. Pat. No. 5,107,736, issued on Apr. 28, 1992 to James O. Albrecht, and
U.S. Pat. No. 5,921,161, issued on Jul. 13, 1999 to Robert M. Newell.

Although the circular saw guides of the prior art deserve undeniable merits, these devices are believed to be deficient in at least the features of being capable of accommodating various makes and models of circular saws, and being readily adjustable for use without having to measure the position of the saw blade relative to the guiding edge. Such lack of instant positioning means can lead to errors in sawing and can cause irreparable damage to expensive wood boards or panels.

As such, it will be appreciated that there continues to be a need for a new and improved circular saw guide which is readily usable with various models of saws, without having to measure using a measuring tape and laboriously adjust the position of the saw blade relative to the guiding edge.

SUMMARY OF THE INVENTION

The present invention provides a floating bench saw guide which has a compact configuration and a saw cradle in which the portable saw is readily positional for use without subjective measurement using a measuring tape.

Broadly, in accordance with one feature of the present invention, there is provided a floating bench saw guide for guiding a portable circular saw along a workpiece while sawing the workpiece. The floating bench saw guide comprises a cradle for retaining a portable circular saw, a saw plane across the cradle, and a guide lip movably affixed to the cradle. A pair of gage blocks are affixed to the cradle or to a structure adjacent the cradle. The gage blocks have a certain thickness and are positioned along the saw plane. The gage blocks define the saw plane. The provision of the gage blocks on the cradle is particularly advantageous for allowing the use of a straight edge such as a carpenter square for easily positioning the blade of a circular saw along the saw plane without having to use a measuring tape to measure the position of the saw blade within the cradle.

In accordance with another feature of the present invention, a pair of spaced-apart parallel rails are affixed to the cradle. The rails have a common length of about thirty six inches and extend away from the saw plane. The guide lip is movably affixed to the rails and is reversible relative to the saw plane. Moreover, the guide lip overhangs its mountings to the rails such that it is positional relative to the saw plane over a distance ranging from about zero inch to about forty-eight inches from the saw plane. The floating bench saw guide is thereby relatively compact in size when the guide lip is positioned in a forward orientation nearest to the saw plane.

In accordance with yet another feature of the present invention, each rail has a ruler affixed thereto. A pointer is affixed to the guide lip and overhangs one of the rulers. The ruler on one rail has a graduation set which is a continuation of the graduation set on the other ruler. The pointer indicates the position of the guide lip relative to the saw plane whether the guide lip is positioned in a forward or reverse orientation.

In accordance with a further feature of the present invention, the guide lip is mounted to an intermediate position along the rails, and a router support member is removably mounted to the far ends of the rails relative to the saw plane. The router support member has a structure which allows its mounting over the cradle. The router support member has clamping means to retain a router over the cradle in place of a circular saw, such that the floating bench saw guide is usable with several carpentry tools.

Still another feature of the floating bench saw guide according to the present invention is that it is susceptible of a low cost of manufacture with regard to both materials and labor, and which accordingly is then susceptible of low prices of sale to the consumer, thereby making such floating bench saw guide economically available to the public.

Other advantages and novel features of the present invention will become apparent from the following detailed description.

BRIEF DESCRIPTION OF THE DRAWINGS

One embodiment of this invention is illustrated in the accompanying drawings, in which like numerals denote like parts throughout the several views, and in which.

DETAILED DESCRIPTION OF THE PREFERRED EMBODIMENT

Figure 1:
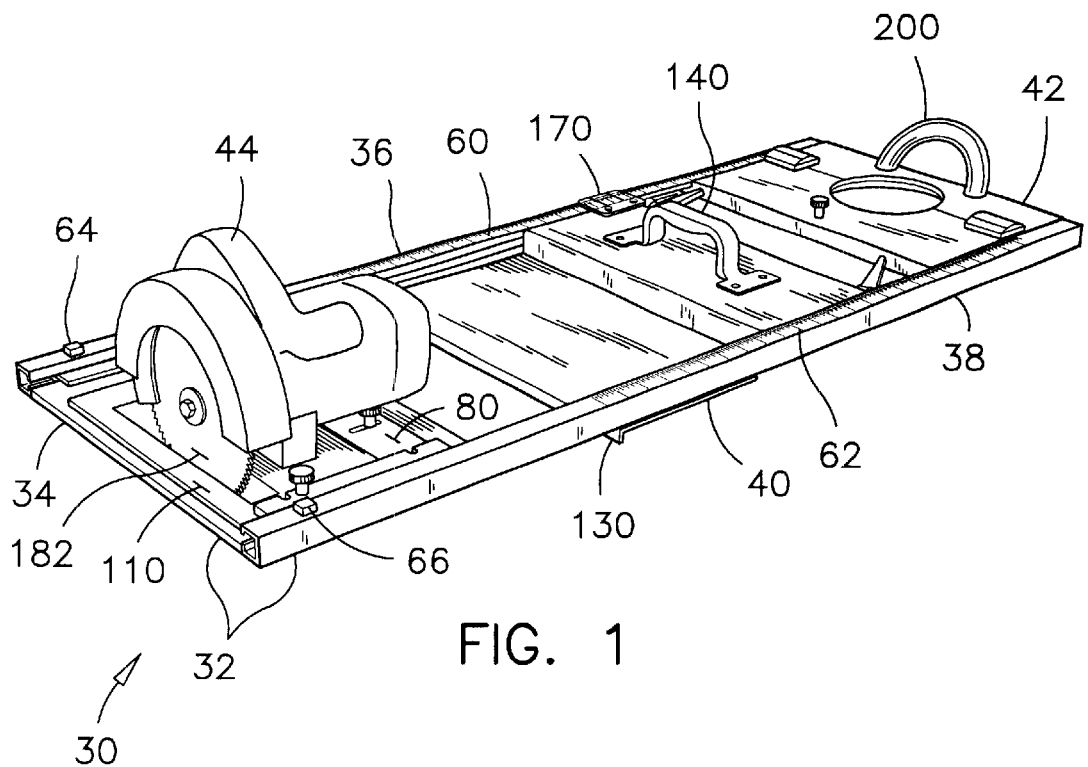
FIG. 1 is a perspective side and top view of the preferred configuration of the floating bench saw guide according to the present invention.
Figure 2:
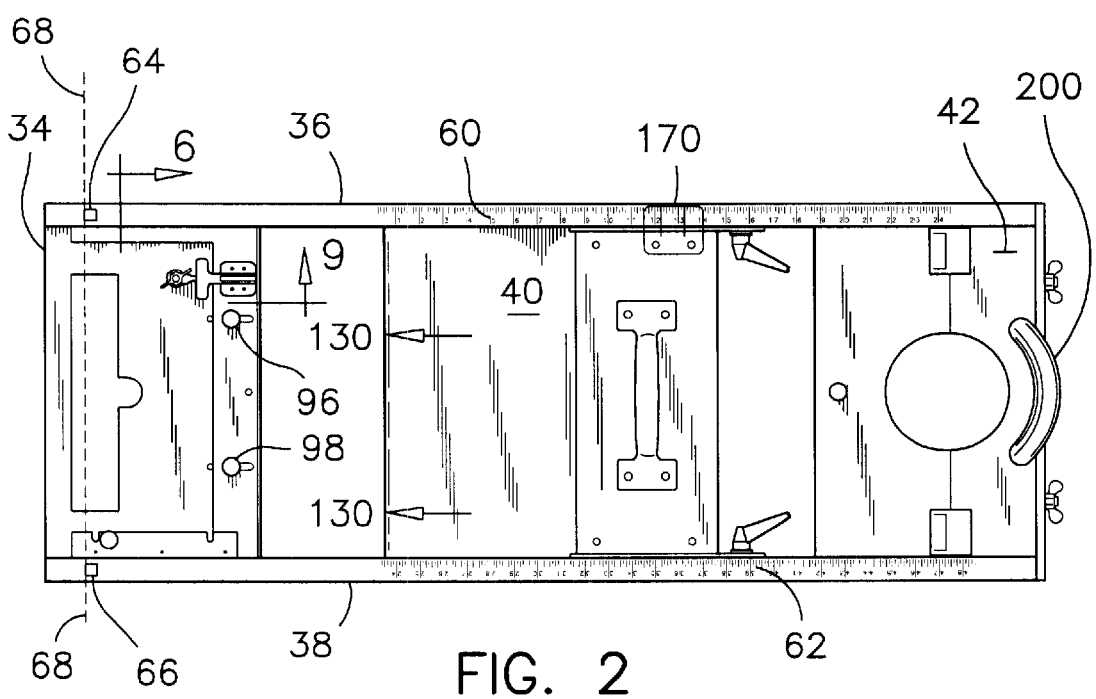
FIG. 2 is a plan view of the floating bench saw guide.
Figure 3:
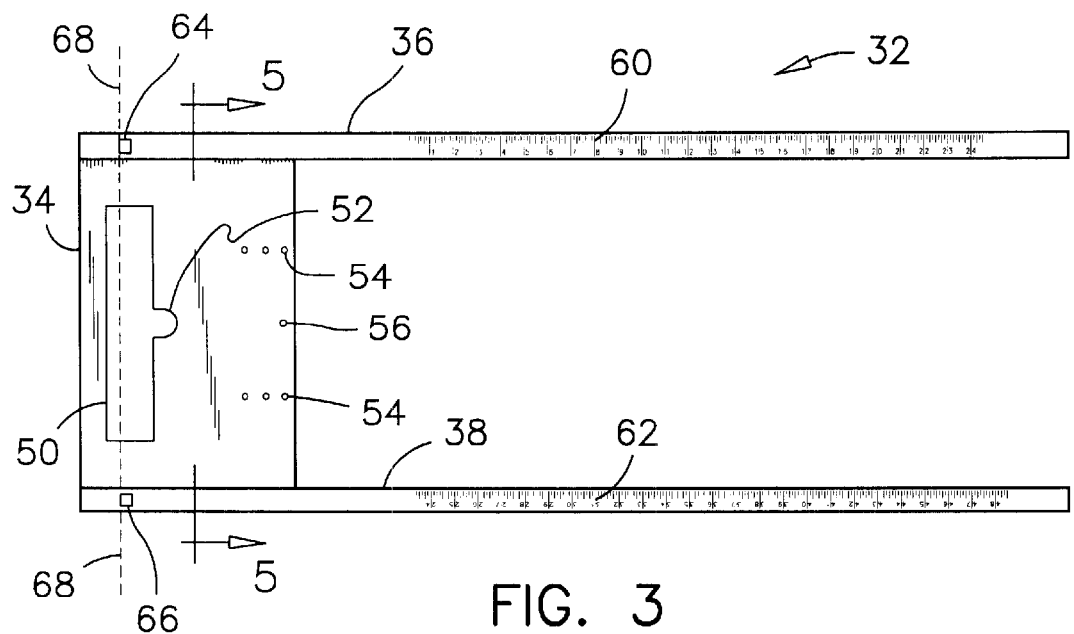
FIG. 3 is a plan view of the base frame of the floating bench saw guide.
Figure 4:
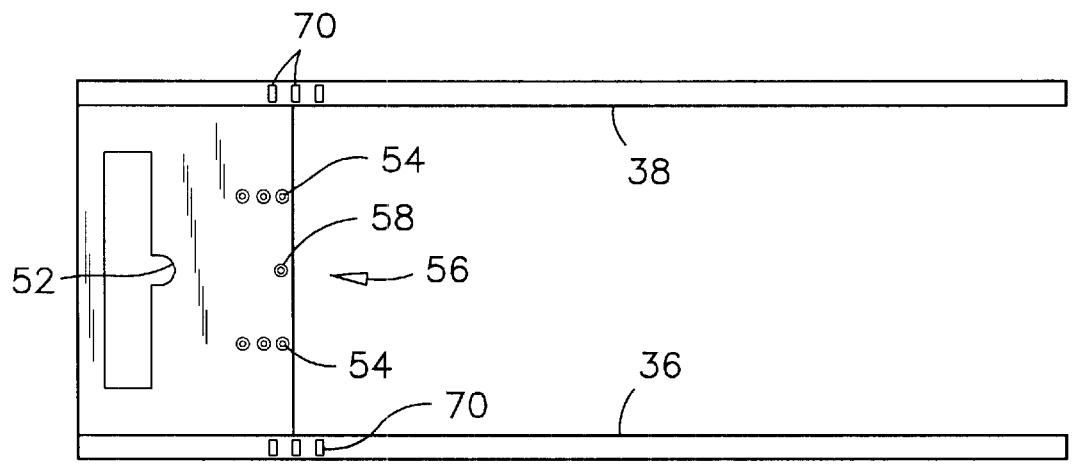
FIG. 4 is the bottom view of the base frame of the floating bench saw guide.

While this invention is susceptible of embodiments in many different forms, there is shown in the drawings and will be described in details herein a specific embodiment, with the understanding that the present disclosure is to be considered as an example of the principles of the invention and is not intended to limit the invention to the embodiment illustrated and described.

Referring firstly to FIG. 1 the major components of the floating bench saw guide according to the preferred embodiment comprises a saw cradle 30, a base frame 32, comprising a base plate 34 and a pair of rails 36, 38 extending from the base plate 34. A movable guide member 40 is engaged with, and movable along the rails 36, 38. A router support member 42 is removably engaged into the far ends of the rails 36, 38 and is optionally mountable over the saw cradle 30 for supporting a router in place of a circular saw 44.

Figure 5:
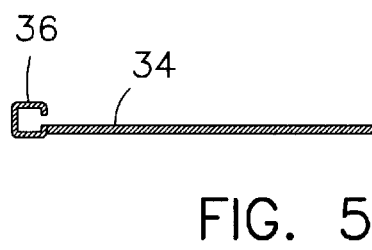
FIG. 5 is a cross-section view of the base frame, as seen along line 5—5 in FIG. 3.

The structural details of the base frame 32 will now be described with reference to FIGS. 1–6. The base plate 34 is affixed to the near ends of the rails 36, 38, flush with or slightly raised from the bottom of the rails as seen in FIG. 5. The preferred base plate 34 is about ¼ of a inch thick and the rails 36, 38 are preferably made of aluminum tubing 1 inch by 1 inch square by 0.120 inch wall thickness. A rectangular opening 50 in the base plate 34 allows the passage of a saw blade and a saw blade guard on a circular saw 44. This rectangular opening 50 is at the near end of the base frame 32. A circular indentation 52 is provided in the rectangular opening for clearance around the chuck of a router (not shown), as will be understood from the following description of the preferred embodiment. An array of threaded holes 54 is provided in the base plate 34 to retain the saw holding plate thereto as will also be explained later. A central hole 56 through the base plate 34 is usable to retain the router support member 42 to the base plate 34. Each of the holes 54, 56 in the base plate as well as in the other parts of the preferred floating bench saw guide is reinforced with a threaded insert 58 known in the field of machine design as a PEM™ fasteners or a NUTSERT™.

Figure 6:
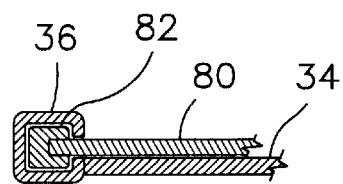
FIG. 6 is a cross-section view of one of the rails in the floating bench saw guide, as seen along line 6 in FIG. 2.

Each of the rails 36, 38 has a longitudinal slot in the inside wall thereof, such that it forms a C-shaped configuration as best illustrated in FIGS. 5 and 6. The slide blocks along the saw holding plate and the movable guide member are movably engaged inside this C-shaped configuration as seen in FIG. 6. Each rail also has a ruler printed thereon or affixed thereto. The ruler 60 on the right side rail 36 is graduated from 0–24 inches. The ruler 62 on the left side rail 38 is graduated from 24–48 inches.

Most importantly, there are two gage blocks 64, 66 affixed to the upper walls of the rails, at the near ends of the rails. These gage blocks 64, 66 define a saw plane 68 against which the saw blade of the circular saw 44 is positioned in the saw cradle 30, and from which both rulers 60, 62 are referenced. The utility of these gage blocks will be further explained when making reference to FIG. 15.

Transverse slots 70 are provided through the underside walls of both rails near the far edge of the base plate 34, for evacuating sawdust which may accumulate inside the rails during use of the floating bench saw guide. If not removed, the sawdust can hinder the movement of the movable guide member 40.

The saw cradle 30 consists of the base plate 34 and the saw holding plate 80 mounted over and overlapping the base plate 34. The saw holding plate has a C-shaped configuration and a pair of sliding block 82, 84 mounted along the edges thereof. The slide blocks are dimensioned to slide precisely but freely inside the rails 36, 38 as illustrated in FIG. 6. The saw holding plate 80 has a thickness of about ⅛ of an inch, and the rectangular opening 90 therein has dimensions to partly enclose the skid plate of a circular saw 44. On the forward side of the saw holding plate, there is provided a clamp bar 92 which is affixed to the saw holding plate 80 by screws 94. The saw holding plate 80 is retained to the base plate 34 by means of two thumb screws 96, 98 through adjustment slots 100, 102 in the saw holding plate, and through two of the series of holes 54 in the base plate 34. The slots 100, 102 and the series of holes 54 provide adjustment to accommodate the holding of various models and sizes of circular saws in the cradle 30.

In use, the skid plate of a circular saw 44, is placed over in the base plate 34 of the floating bench saw guide and inside the rectangular opening 90 of the saw holding plate 80. The forward edge of the skid plate is inserted under the clamp bar 92, and is clamped down against the base plate 34 using the thumb screw 104 through the clamp bar 92. The rear end of the skid plate 110 of the circular saw 44 is held down against the base plate 34, by a toggle clamp 112 on the saw holding plate, near the rear end of the saw holding plate 90. This type of toggle clamp 112 is available from Carr-Lane Manufacturing Co., a company from St. Louis, Mo., USA. A wing nut 114 is provided on the bumper 116 of the toggle clamp, for easy height adjustment of the bumper 116 to accommodate various thicknesses of skid plates 110.

Figure 7:
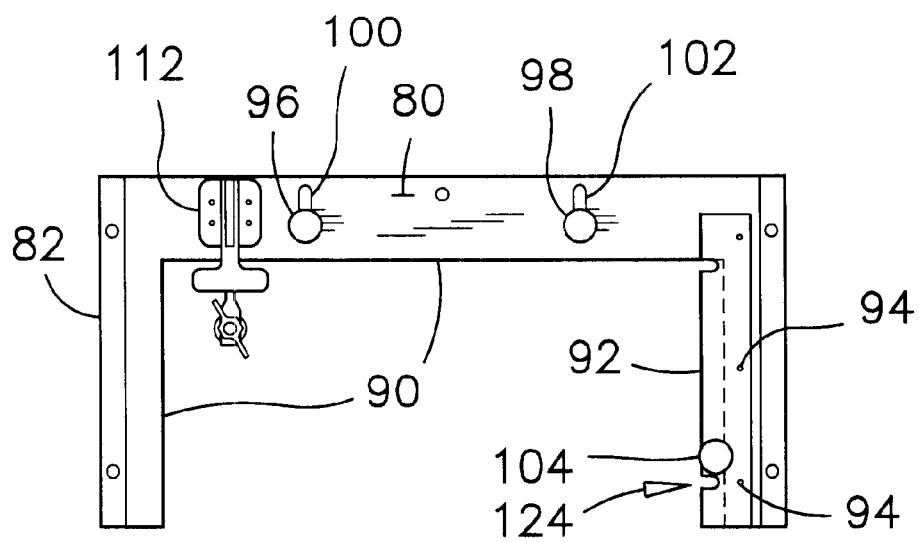
FIG. 7 is a plan view of the saw holding plate in the floating bench saw guide.
Figure 8:
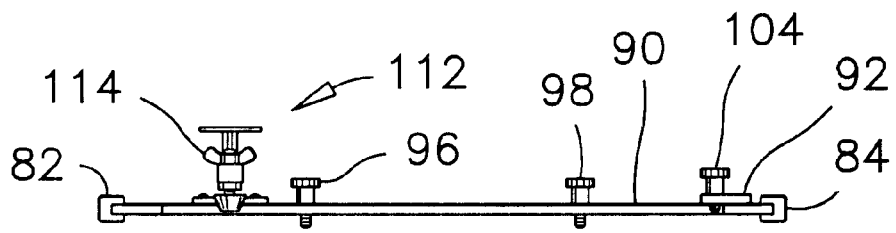
FIG. 8 is an end view of the saw holding plate.
Figure 9:
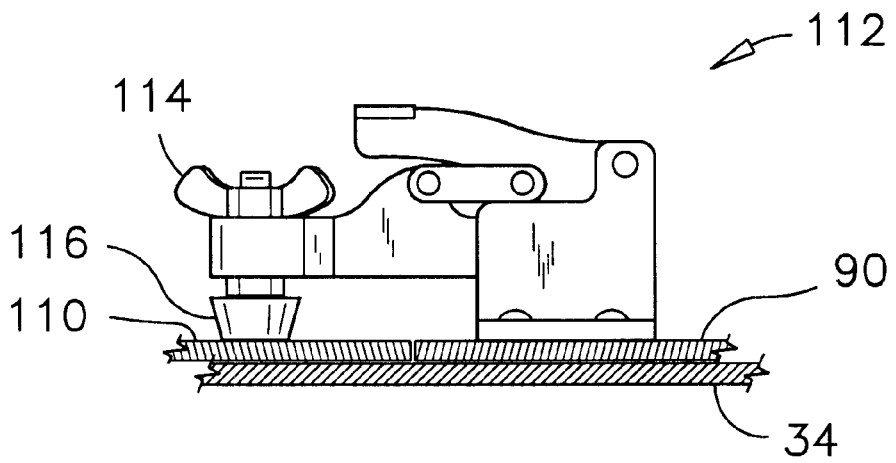
FIG. 9 is an enlarged side view of the toggle clamp mounted on the saw holding plate.
Figure 10:
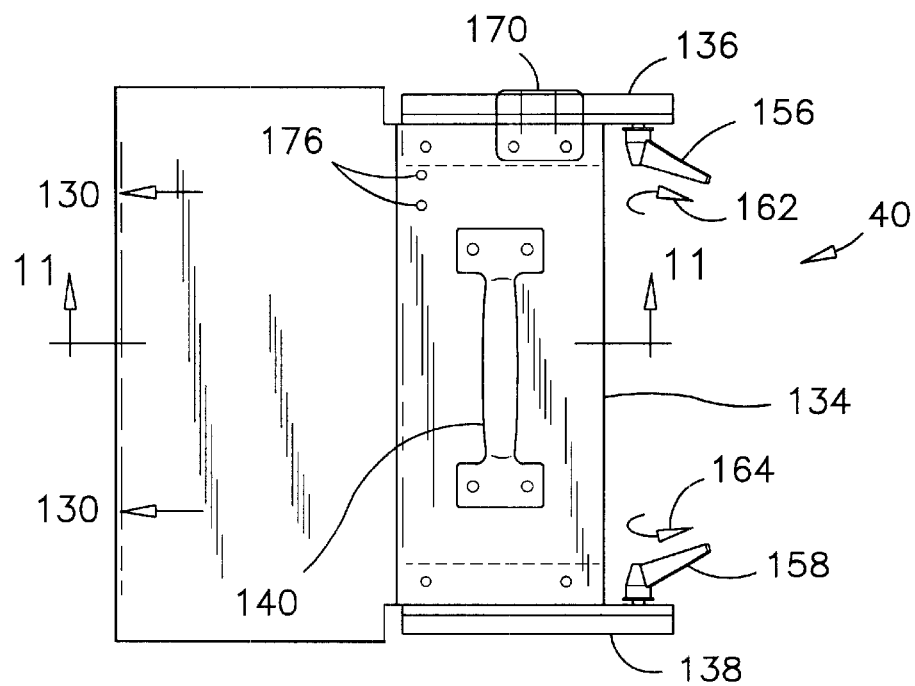
FIG. 10 is a plan view of the movable guide member comprised in the preferred floating bench saw guide.
Figure 11:
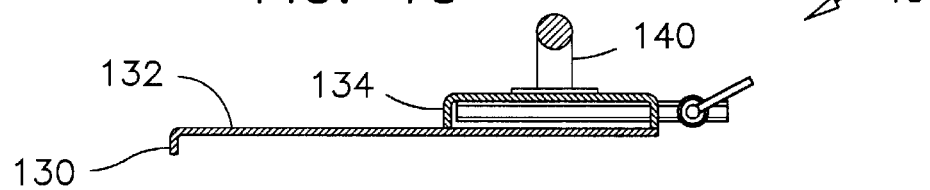
FIG. 11 is a cross-section view through the movable guide member as seen along line 11—11 in FIG. 10.
Figures 12, 13:
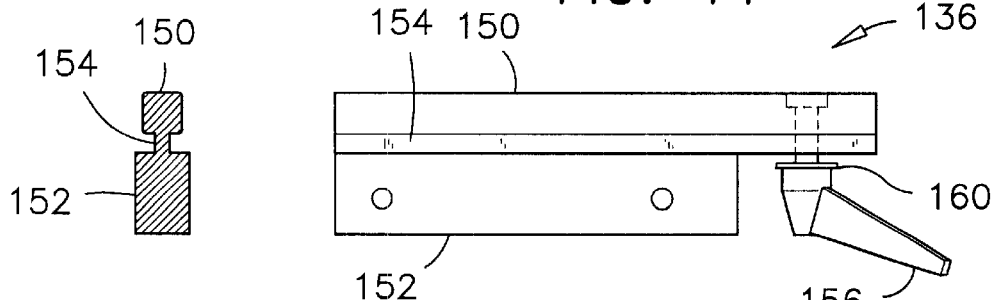
FIG. 12 is an enlarged top view of a slide block comprised in the movable guide member.
FIG. 13 is an end view of the slide block shown in FIG. 12.
Figure 14:
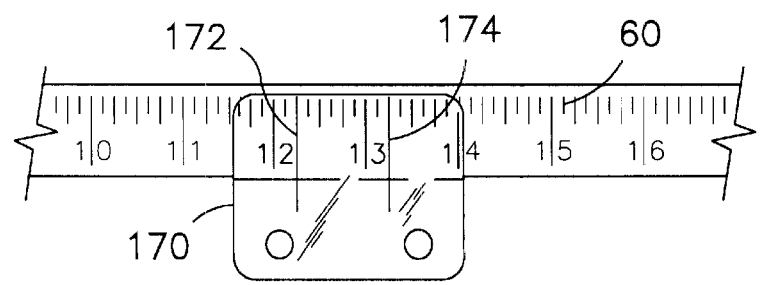
FIG. 14 is a plan view of the sight glass affixed to the movable guide member.

Also as illustrated in FIG. 7, a slot 124 is provided in the clamp bar 92. In use, the slot 124 is positioned to coincide with any raised deformation that may be present on the skid plate 110 of a portable saw 44.

The movable guide edge 40 will now be described with reference to FIGS. 10–17. The movable guide edge 40 comprises a guide lip 130 formed on the edge of an guide-carrier plate 132. A channel-like member 134 is affixed to the top side of the guide-carrier plate 132 and encloses a pair of slider blocks 136, 138. These slider blocks have dimensions for sliding freely but precisely inside the rails 36, 38. The guide-carrier plate 132, is held below the slider blocks 136, 138, such that it moves under both rails 36, 38 as shown in FIG. 17, under the base plate 34 and under the router support member 42.

A handle 140 is provided on the channel-like member 134 to facilitate the adjustment of the movable guide member and to support the preferred floating bench saw guide in use.

Each of the slider blocks 136, 138 has a slider portion 150 which has a similar cross-section as the inside dimensions of one of the rails, and an anchor portion 152 which has dimensions for precise insertion inside one end of the channel-like member 134, and attachment to the channel-like member. The slider portion 150 is retained to the anchor portion 152 by a thin portion 154 having substantially a same thickness as the width of the slot in each of the rails. There is further provided in each of the slider blocks 136, 138, a quarter-turn lock nut 156, 158, each having a stem extending through the slider portion 150 of each slider block. These lock nuts are used to selectively clamp the wall of the rails between the slider portion 150 and a washer 160 under each lock nut, for the purpose of locking the movable guide member 40 to the rails 36, 38. The quarter-turn lock nut 156 on the right side of the preferred floating bench saw guide has a clockwise thread, and the quarter-turn lock nut 158 on the left side has a counter-clockwise thread as represented by arrows 162 and 164 respectively in FIG. 10. These lock nuts are thereby easily loosened and tightened in a common direction for adjusting the position of the movable guide edge member 40 along the rails 36, 38.

The exact position of the movable guide edge 40 along the rails 36, 38 is easily confirmable by means of a sight glass 170 affixed to the channel-like member 134 and extending above one of the rulers 60, 62 on the rails of the preferred floating bench saw guide. A first hairline 172 indicates the position of the guide lip 130 relative to the saw plane 68. A second hairline 174 indicates the position of the guide lip 130 relative to the position of the tool bit when a router is used in place of the saw 44. The second hairline 174 indicated the position of the guide lip 130 relative to the center of the circular indentation 52 in the base plate 34.

Referring back to FIG. 10, there are two threaded holes 176, for optionally retaining the thumb screws 96, 98 and preventing these screws from becoming lost when the saw holding plate 80 is removed from the base plate 34.

Figure 15:
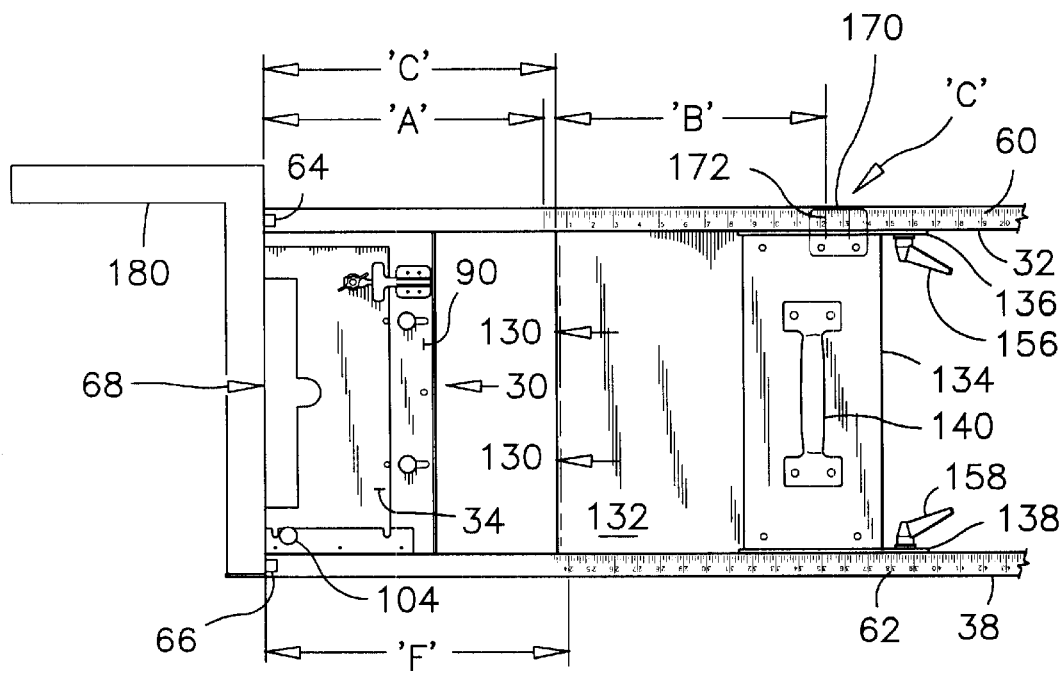
FIG. 15 is another plan view of the floating bench saw guide showing specific reference dimensions, and showing the movable guide member mounted in a forward orientation nearest to the saw plane.
Figure 16:
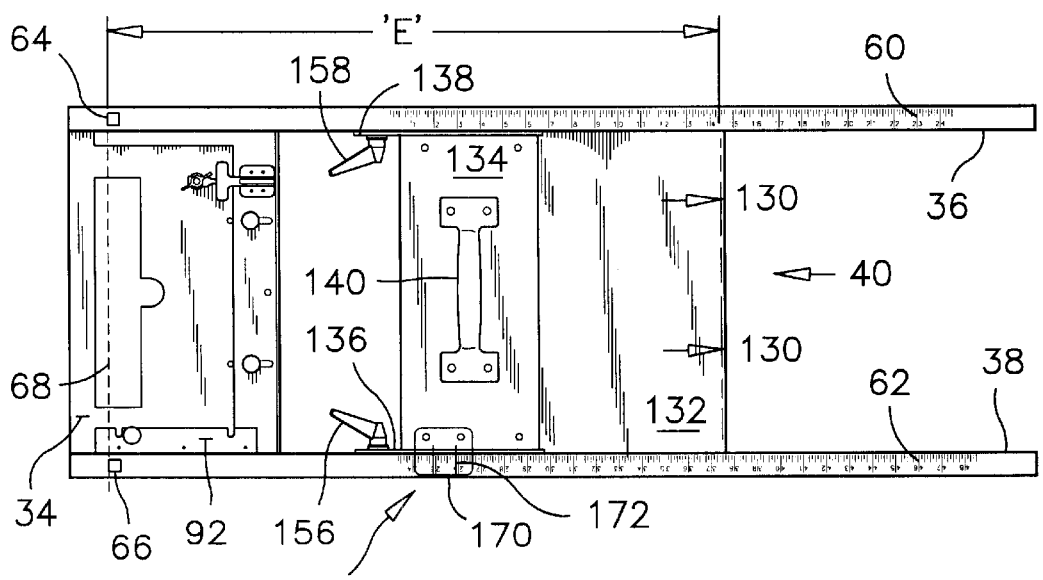
FIG. 16 is yet another plan view of the floating bench saw guide wherein the movable guide member is mounted in a reverse orientation farthest from the saw plane.
Figure 17:
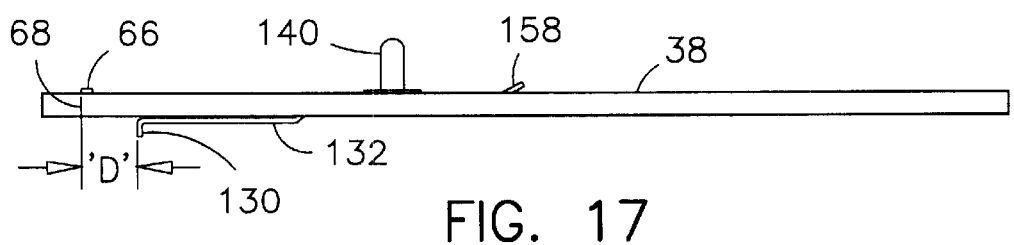
FIG. 17 is a side view of the floating bench saw guide with the movable guide member mounted in a forward orientation.
Figures 18, 19:
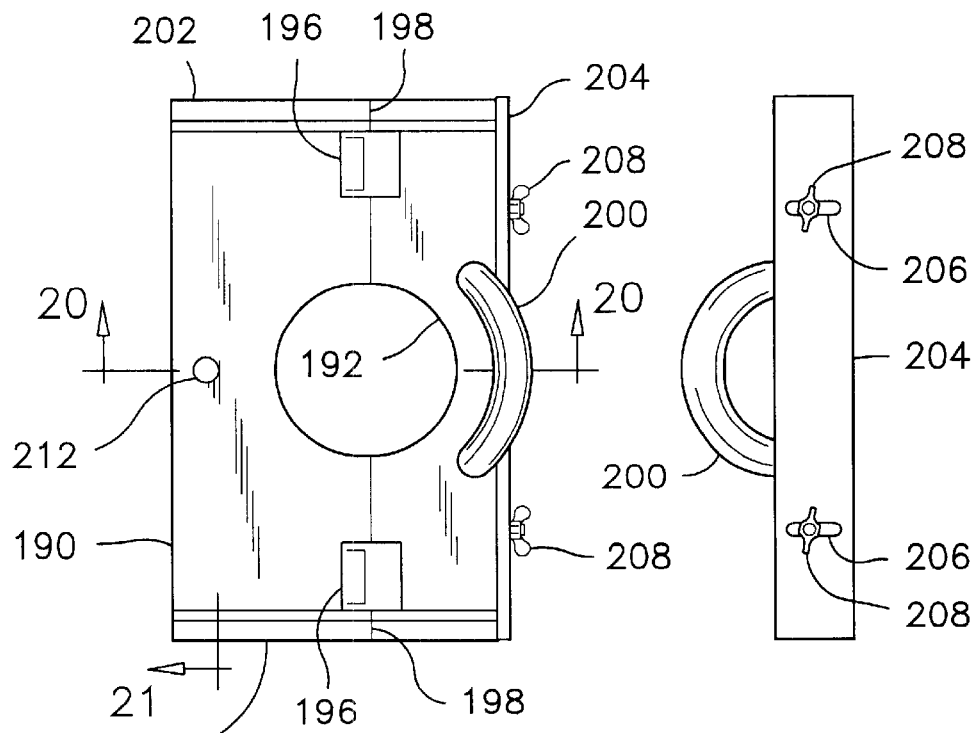
FIG. 18 shows a plan view of the router support member which is optionally comprised with the preferred floating bench saw guide.
FIG. 19 is an end view of the router support member.
Figures 20, 21:
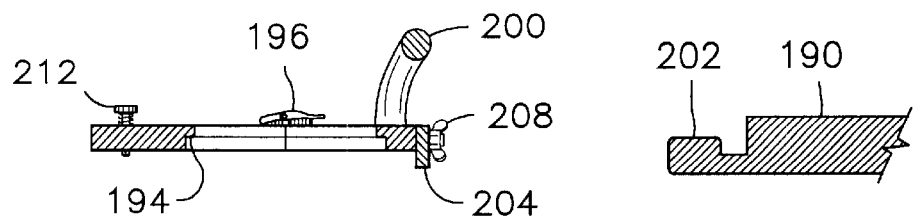
FIG. 20 is a cross-section view through the router support member as seen along line 20—20 in FIG. 18.
FIG. 21 is another cross-section view through the router support member, as seen along line 21 in FIG. 18.
Figure 22:
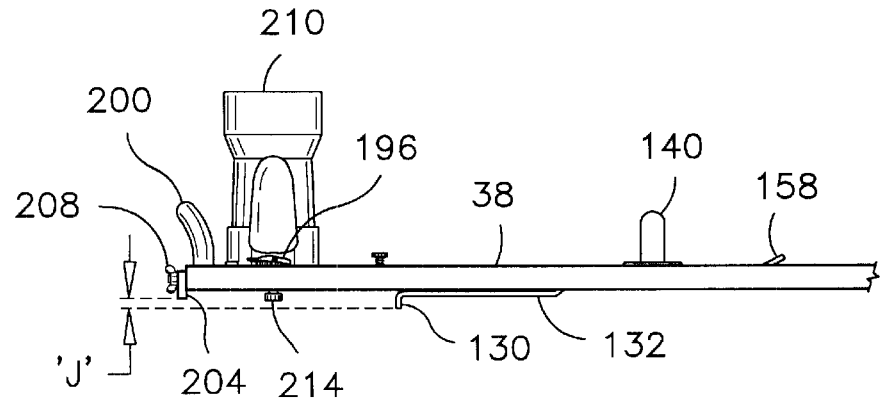
FIG. 22 is a side view of the floating bench saw guide with a router in place of a circular saw.

Reference is now made to FIGS. 1, 15 and 16 to explain some of the most important features of the floating bench saw guide according to the preferred embodiment. The mounting of a portable circular saw 44 in the saw cradle 30 is preferably effected while using a carpenter square 180 laid against the gage blocks 64, 66 as illustrated in FIG. 15. The saw guard of the circular saw 44 is moved up, and the saw blade 182 is moved against the carpenter square 180. Then the skid plate 110 of the circular saw is clamped down against the base plate 34 as previously explained. This procedure ensure that the outside face of the saw blade 182 is aligned with the saw plane 68.

Although a carpenter square 180 has been suggested for adjusting the position of the saw blade along the saw plane 68, it will be appreciated that any straight edge such as a piece of molding or a piece of board can also be used to obtain the same result.

The right side ruler 60 is positioned such that the distance 'A' between the zero mark on the ruler and the saw plane 68 is a same distance as the measurement 'B' between the guide lip 130 and the left hairline 172 on the sight glass 170. Therefore the actual distance 'C' between the guide lip 130 and the saw plane 68 is read under the hairline 172.

The guide-carrier plate 132 has a substantial length measured along the rails, to provide the option of bringing the guide lip 130 close to the saw plane 68 if required. When the movable guide member 40 is in the forward orientation as illustrated in FIGS. 15 and 17, the guide lip 130 is movable to a distance 'D' of about ⅛ inch or less from the saw plane 68.

Both slide blocks 136, 138 on the movable guide member 40 are symmetrical and parallel, such that the movable guide member is reversible in its mounting inside the rails 36, 38 as shown in FIG. 16. When the movable guide member 40 is mounted in this position, referred to herein as the reverse orientation, the distance 'E' between the near side of the guide lip 30 and the saw plane 68 is a same distance as read on the left side ruler 62 under the hairline 172. For this reason, the zero mark on the left side ruler 62 is set at a distance 'F' from the saw plane 68 which corresponds to the distance 'A' plus the thickness of the guide lip 130.

The structure of the router support member 42 is illustrated in FIGS. 18–22. The router support member 42 comprises a thick plate 190 made of plastic material for example, and has a hole 192 through its center. The hole 192 may have a shoulder 194 to conform to the shape of a router body. The plate 190 is made in two pieces which are joined together by a pair of clasps 196 extending over a tongue-and-groove parting line 198. The hole 192 has dimensions to provide a tight fit over a router body, such that a router body may be retained to the plate 190 when the clasps 196 are closed. A handle 200 is also provided to assist in operating the preferred floating bench saw guide with a router in place of a circular saw.

Each of the side edges 202 of the thick plate 190 has a shape and a groove on its upper surface to mount into one of the slotted rails 36, 38. The lower surface of the thick plate 190 is planar and smooth such that it can be inserted into the near ends of the rails and over the base plate 34, in place of the saw holding plate 80. When not used, the router support member 42 is preferably inserted in the far ends of the rails and left there to keep the rails in parallel alignment and to prevent damage to the far ends of the rails in use.

A level gage blade 204 is affixed to the front edge of the thick plate 190 and is used when a router 210 is installed in the preferred floating bench saw guide in place of a circular saw. The level gage blade 204 is adjustable up and down relative to a working position of the router support member, by means of a pair of slots 206 and two wing nuts 208. The level gage blade 204 is advantageous for leveling the preferred floating bench saw guide along a workpiece when the guide lip 130 is made to slide in a router-made shallow groove for example, and to ensure that the next groove will be truly perpendicular to the surface of the workpiece. The utility of the level gage blade 204 will be further explained when making reference to FIG. 24.

The router support member 42 is adjusted and retained to the base plate 34 by means of a thumb screw 212 mating into the threaded hole 56 in the base plate 34. The position of the screw 212 and the hole 56 in the base plate 34 are calibrated with the number sets on the rulers 60, 62 such that the center of the router bit 214 relative to the guide lip 130 is indicated on one of the rulers, under the hairline 174 on the sight glass 170.

As may be understood from the foregoing detailed description, the preferred floating bench saw guide is used while holding the circular saw 44 in one hand and the handle 140 of the movable guide member in the other hand. The guide lip 130 is brought against a straight edge of the workpiece and the saw is driven through the workpiece to cut the workpiece at the exact measurement from the guide lip 130 as is indicated on one of the rulers under the hairline 172.

While a right-handed circular saw 44 has been illustrated, it may be appreciated that the all the components of the preferred floating bench saw guide are symmetrical and can be reversed to accommodate a left-handed circular saw. Similarly, braille rulers may also be used to accommodate the visually impaired users of the floating bench saw guide according to the preferred embodiment.

Figure 23:
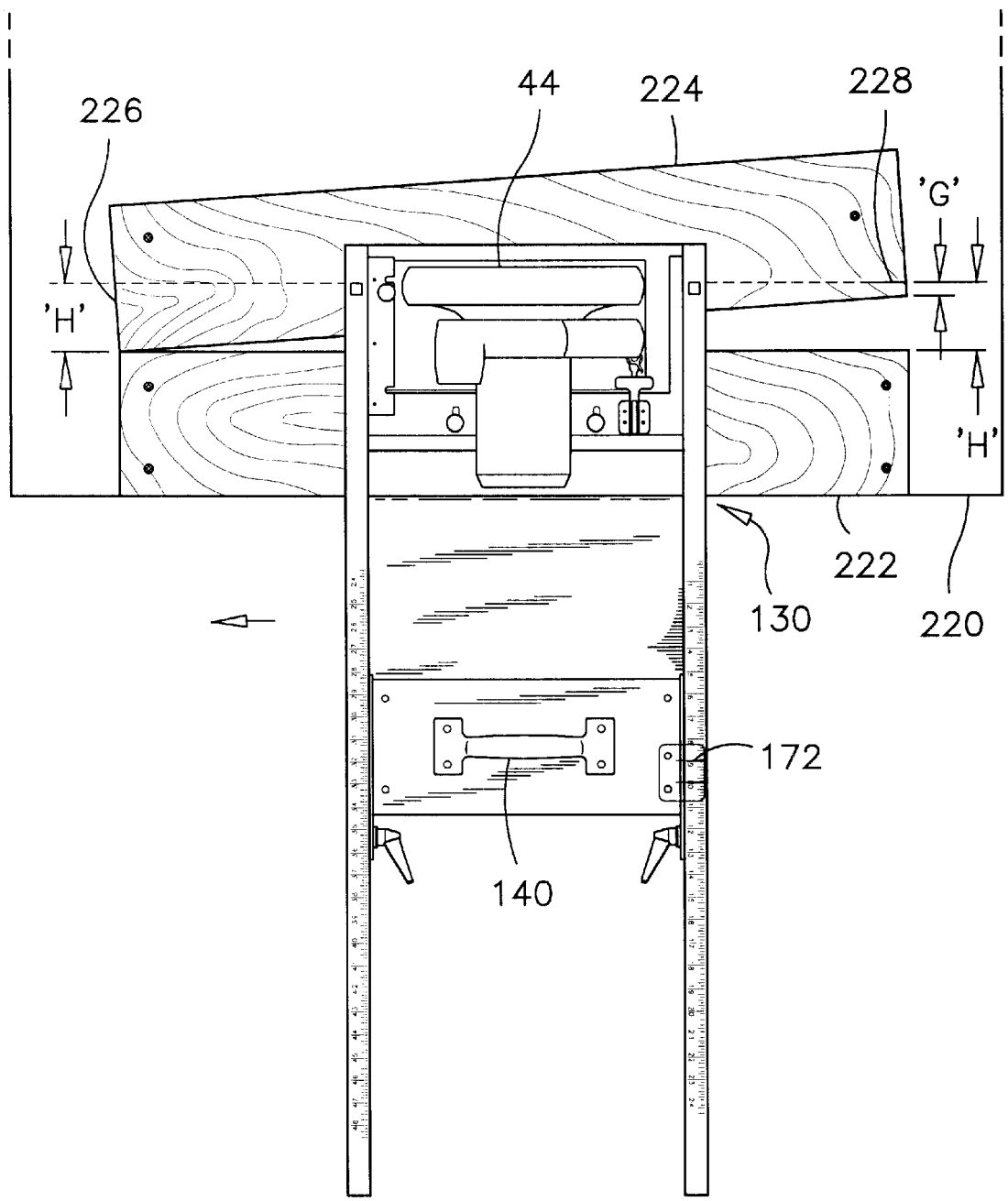
FIG. 23 illustrates a method, using the floating bench saw guide with a circular saw mounted therein, for sawing a wedge-shaped shim.

The floating bench saw guide according to the preferred embodiment of the present invention can also be used to perform non-conventional work such as sawing a workpiece along an acute angle for example, as illustrated in FIG. 23. In this case, the work is performed on a table 220 or on carpenter benches. A piece of lumber 222 is temporarily affixed to the table 220 or to the benches. The workpiece 224 to be sawn is placed against the piece of lumber 222 with the largest finished end 226 of the workpiece resting against the piece of lumber. A saw mark 228 indicating the width 'G' at smallest finished end of the workpiece 224 is moved away from the piece of lumber 222 a distance 'H' equal to the finished width of the workpiece at the large finished end 226. The workpiece 224 is then temporarily affixed to the table 220. The cut is then effected with the preferred floating bench saw guide as explained before, that is with the guide lip 130 sliding against the piece of lumber 222.

Figure 24:
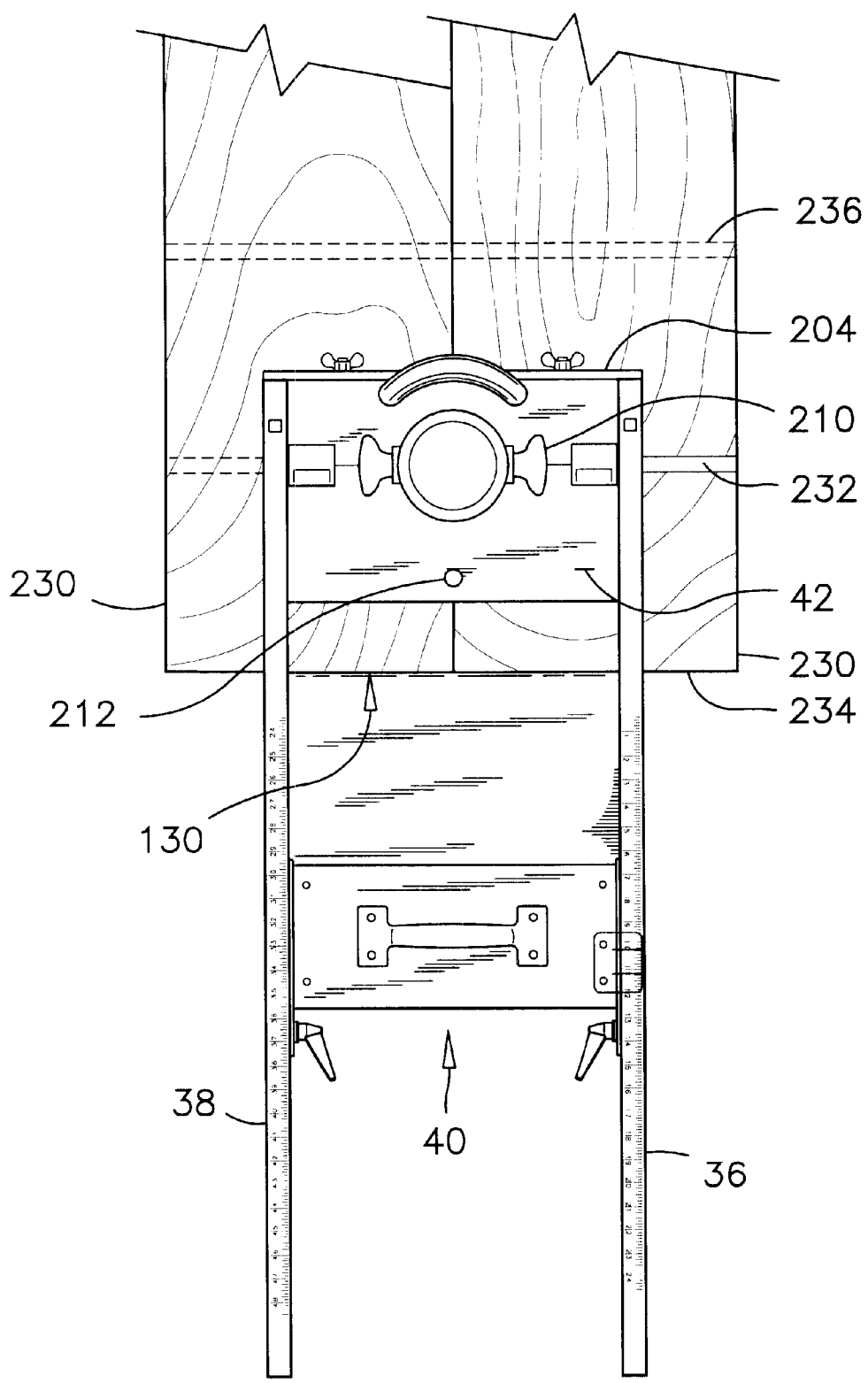
FIG. 24 illustrates a method, using the floating bench saw guide with a router mounted therein, for making book case ends.

A second application of the preferred floating bench saw guide is illustrated in FIG. 24. In this application, a router 210 and router support member 42 are used in place of a circular saw. The preferred floating bench saw guide is used to cut shelving seat grooves in a pair of bookcase ends. The first groove 232 is effected while manipulating the preferred floating bench saw guide as previously explained, that is with the guide lip 130 sliding against the ends 234 of the bookcase ends. The second and subsequent grooves 236 are effected while sliding the guide lip 130 into the adjacent groove 232. Depending upon the depth at which the grooves are made, the level gage blade 204 may be adjusted to maintain the rails 36, 38 parallel with the surface of the workpiece and to maintain the second and subsequent grooves true with the surface of the bookcase ends.

Reference may be made again to FIG. 22 to better understand the adjustment of the level gage blade 204. In the case of the bookcase ends 230 as just explained, the level gage blade 204 is set higher than the bottom edge of the guide lip 130 by a dimension 'J' which is equivalent to the depth at which the first groove has been made.

It will be appreciated from the examples illustrated in FIGS. 23 and 24 that the applications of the floating bench saw guide according to the preferred embodiment in carpentry work are limited only by the imagination of the users. As such, it is believed that further explanation relative to the manner of usage and operation of the floating bench saw guide according to the present invention would be considered repetitious and is not provided.

While only one embodiment of the present invention has been illustrated in the accompanying drawings and described herein above, it will be appreciated by those skilled in the art that various modifications, alternate constructions and equivalents may be employed without departing from the true spirit and scope of the invention. Therefore, the above description and the illustrations should not be construed as limiting the scope of the invention, which is defined by the appended claims.

I claim:

1. A floating bench saw guide for attachment to a hand-held power tool for guiding said hand-held power tool along a workpiece while performing work on said workpiece, said floating bench saw guide comprising:
   a cradle for supporting a hand-held power tool;
   a pair of spaced-apart parallel rails affixed to said cradle and extending away from said cradle;
   a movable guide member having a pair of slider blocks movably affixed to said rails and a guide-carrier plate affixed to said slider blocks, said guide-carrier plate having a guide lip thereon;
   said movable guide member having a longitudinal dimension along said rails and said pair of slider blocks and said guide lip being on opposite ends along said longitudinal dimension, whereby said guide lip is positional beyond a length of said rails.

2. The floating bench saw guide as claimed in claim 1 wherein said rails have a first and second rulers affixed thereto respectively, and each of said rulers has numeral markings thereon; said numeral markings on said second ruler being a continuation of said numeral markings on said first ruler.

3. The floating bench saw guide as claimed in claim 2, wherein said movable guide member has a sight glass affixed thereto and held over one of said rulers, said sight glass having a first hairline thereon.

4. The floating bench saw guide as claimed in claim 3, wherein said slider blocks are symmetrical whereby said movable guide member is reversible between said parallel rails.

5. The floating bench saw guide as claimed in claim 4, wherein said cradle further comprises an opening therein for receiving a saw blade of a power saw and a pair of gage blocks affixed to said cradle and defining a straight line across said opening, and one of said rulers has a zero mark at a distance from said straight line.

6. The floating bench saw guide as claimed in claim 2, wherein said first ruler has graduations from zero to twenty-four inches and said second ruler has graduations from twenty-four inches to forty-eight inches.

7. The floating bench saw guide as claimed in claim 5, wherein a measurement between said guide lip and said hairline is equal to said distance.

8. The floating bench saw guide as claimed in claim 7, wherein said distance is about twelve inches.

9. The floating bench saw guide as claimed in claim 5, wherein said rails are made of square tubing and said slider blocks have dimensions to allow a free movement thereof inside said rails.

10. The floating bench saw guide as claimed in claim 1, wherein each of said slider blocks has a threaded stem extending therefrom, a quarter-turn lock nut on said threaded stem and means for clamping one of said rails between said quarter-turn nut and said slider block.

11. The floating bench saw guide as claimed in claim 10, wherein one of said threaded stems and one of said quarter-turn lock nuts have a clockwise engagement and the other threaded stem and other quarter-turn lock nut have a counter-clockwise engagement.

12. The floating bench saw guide as claimed in claim 11, wherein said movable guide member has a handle affixed thereto.

13. The floating bench saw guide as claimed in claim 5, wherein said cradle comprises a C-shaped saw holding plate adjustably affixed to said base plate, said C-shaped saw holding plate having a rectangular opening therein for enclosing a skid plate of a portable circular saw, a clamp bar affixed thereto for enclosing a front portion of said skid plate and a toggle clamp mounted thereon for clamping a rear portion of said skid plate.

14. The floating bench saw guide as claimed in claim 1, further comprising a router support member detachably mounted to said rails opposite said cradle relative to said movable guide member.

15. The floating bench saw guide as claimed in claim 5, further comprising a portable circular saw having a blade surface positioned along said straight line.

16. The floating bench saw guide as claimed in claim 14, wherein said router support member has means for attachment to said base plate and means for positioning a router relative to said rulers.

17. The floating bench saw guide as claimed in claim 16 wherein said router support member comprises a level gage affixed thereto.

18. The floating bench saw guide as claimed in claim 16, wherein said sight glass comprises a second hairline, and a position of said guide lip relative to said means for positioning a router is determinable according to a position of said second hairline over one of said rulers.

19. A floating bench saw guide for attachment to a hand-held power tool for guiding said hand-held power tool along a workpiece while performing work on said workpiece, said floating bench saw guide comprising:

a cradle for supporting a hand-held power tool;

a pair of spaced-apart parallel rails affixed to said cradle and extending away from said cradle;

a movable guide member movably affixed to said rails and comprising a guide lip affixed thereto and having a surface facing said cradle, and means for positioning said surface at a distance from said cradle beyond a length of said rails.

* * * * *